United States Patent
Bergerhoff et al.

(10) Patent No.: US 7,909,213 B2
(45) Date of Patent: Mar. 22, 2011

(54) CARRIER FOR A BICYCLE

(75) Inventors: Harald Bergerhoff, Hamburg (DE); Michael Waller, Hamburg (DE); Gerald Hahn, Wistedt (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 927 days.

(21) Appl. No.: 11/774,232

(22) Filed: Jul. 6, 2007

(65) Prior Publication Data

US 2008/0006663 A1    Jan. 10, 2008

(30) Foreign Application Priority Data

Jul. 8, 2006    (DE) .......................... 10 2006 031 689

(51) Int. Cl.
*B60R 9/10*    (2006.01)
(52) U.S. Cl. .......................... 224/197; 224/510; 224/924
(58) Field of Classification Search .................. 224/282, 224/496, 497, 508, 489, 491, 924, 510; 403/107, 403/108; 248/188.5
See application file for complete search history.

(56) References Cited

U.S. PATENT DOCUMENTS

| | | | |
|---|---|---|---|
| 2,052,483 A | 8/1936 | Monteith | |
| 2,817,548 A * | 12/1957 | Uthemann | 403/104 |
| 6,626,340 B1 * | 9/2003 | Burgess | 224/536 |
| 7,757,916 B1 * | 7/2010 | Petrie et al. | 224/403 |
| 2005/0061842 A1 | 3/2005 | Tsai | |

FOREIGN PATENT DOCUMENTS

| | | |
|---|---|---|
| CH | 651 609 A5 | 9/1985 |
| DE | 7 124 927 | 6/1971 |
| DE | 76 00 757 | 3/1978 |
| DE | 198 26 077 A1 | 12/1998 |
| DE | 299 16 746 U1 | 1/2000 |
| DE | 699 21 413 T2 | 2/2006 |
| EP | 0 426 628 A2 | 5/1991 |
| EP | 0 820 902 A1 | 1/1998 |
| FR | 1 518 528 | 7/1968 |

\* cited by examiner

*Primary Examiner* — Justin M Larson
(74) *Attorney, Agent, or Firm* — Brooks Kushman P.C

(57) ABSTRACT

A bicycle carrier for a vehicle includes a support holder for holding a bicycle aligned transversely to a longitudinal direction of a vehicle. A retaining bracket connected to the support holder has a guide holder and retaining bracket sections. The bracket sections are movably connected to the guide holder to move transversely to the longitudinal vehicle direction. The bracket sections hold respective wheels of a bicycle held on the support holder. Fixing elements are respectively connected to the retaining bracket and a corresponding bracket section. Each fixing element includes a locking member movable between a locked position in which the fixing element locks the corresponding bracket section in place and an unlocked position in which the fixing element unlocks the corresponding bracket section. Actuating mechanisms respectively associated with the fixing elements are operable to move the locking member of the corresponding fixing element between the locked and unlocked positions.

13 Claims, 3 Drawing Sheets

CARRIER FOR A BICYCLE

CROSS-REFERENCE TO RELATED APPLICATIONS

This application claims foreign priority benefits under 35 U.S.C. §119(a)-(d) to DE 10 2006 031 689.4, filed Jul. 8, 2006, which is hereby incorporated by reference in its entirety.

BACKGROUND OF THE INVENTION

1. Field of the Invention

The present invention relates to a bicycle carrier for a motor vehicle.

2. Background Art

DE 699 21 413 T2 describes a bicycle carrier having a clamping stand. The clamping stand has a clamp for clamping onto a tubular frame of a bicycle. The stand further has a transverse frame having a central tube in which a telescoping side tube is inserted. Free ends of the side tube include adjustable supports for the bicycle wheels. Holding straps fix the wheels to the supports. Clamping screws hold the side tube in the respective position in the center tube.

FR 1 518 528 describes a bicycle carrier fastened to the roof of a vehicle. The carrier includes side rails having a support for a bicycle frame and holders for the bicycle wheels. The holders are tubular sections which surround the side rails and are longitudinally displaceable for adapting to different wheels of various bicycles.

SUMMARY OF THE INVENTION

An object of the present invention includes a bicycle carrier having a retaining bracket and fixing elements in which retaining bracket sections of the retaining bracket are adjustable to accommodate the wheels of a bicycle and the fixing elements fix the retaining bracket sections in place relative to the retaining bracket.

In carrying out the above object and other objects, the present invention provides a bicycle carrier for a vehicle. The carrier includes a support holder for holding a bicycle aligned transversely to a longitudinal direction of a vehicle. A retaining bracket is connected to the support holder. The retaining bracket has a guide holder and a pair of retaining bracket sections, the retaining bracket sections are movably connected to respective ends of the guide holder to move transversely to the longitudinal vehicle direction away from and into the guide holder. The retaining bracket sections hold respective wheels of a bicycle held on the support holder. A pair of fixing elements are respectively connected to the retaining bracket and a corresponding one of the retaining bracket sections. Each fixing element includes a locking member movable between a locked position in which the fixing element locks the corresponding retaining bracket section in place relative to the guide holder and an unlocked position in which the fixing element unlocks the corresponding retaining bracket section such that the corresponding retaining bracket section is movable relative to the guide holder. Each locking member is biased by a spring to be in the locked position. A pair of actuating mechanisms are respectively associated with the fixing elements. Each actuating mechanism is operable to move the locking member of the corresponding fixing element between the locked and unlocked positions.

Primary advantages achieved by a bicycle carrier in accordance with embodiments of the present invention are that the retaining bracket sections of the retaining bracket allow properly functioning and convenient adjustability of the retaining bracket sections relative to the bicycle on account of the fixing elements, together with spring-loaded locking members and the optimally operating actuating mechanisms. Each locking member of a fixing element includes a pressure plate which cooperates with the supporting wall of the retaining bracket section. Each pressure plate may include a friction-enhancing friction lining on its side facing the supporting wall. The spring is biased to move the pressure plate into a locked position. The actuating mechanism together with the actuating pin and the hand lever is an apparatus which may be implemented with reasonable technical effort. The locking member together with the actuating mechanism and hand lever may be integrated into the bicycle carrier with an advantageous economy of space.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
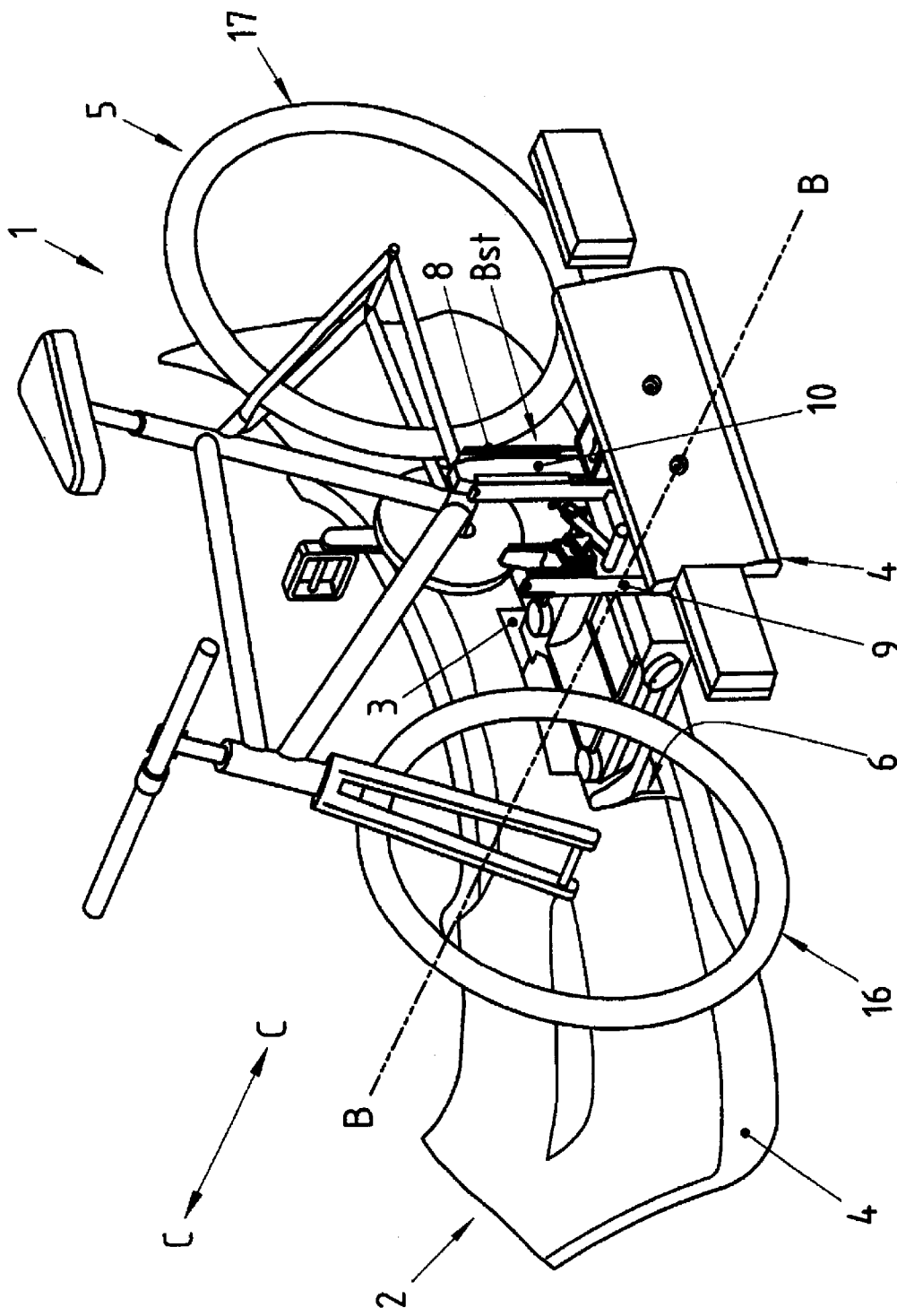
FIG. 1 illustrates a perspective view of a vehicle having a bicycle carrier in accordance with an embodiment of the present invention.

Identical or similar components have the same reference numerals in the figures.

Referring now to FIG. 1, a perspective view of a rear end portion 2 of a vehicle 1 having a bicycle carrier 4 in accordance with an embodiment of the present invention is shown. Rear end vehicle portion 2 has an opening 3 in a central longitudinal plane B-B of vehicle 1 for receiving an extension of carrier 4 in order for carrier 4 to be mounted to vehicle 1. Carrier 4 is intended for use with vehicle 1 to transport two upright bicycles side-by-side.

Figure 2:
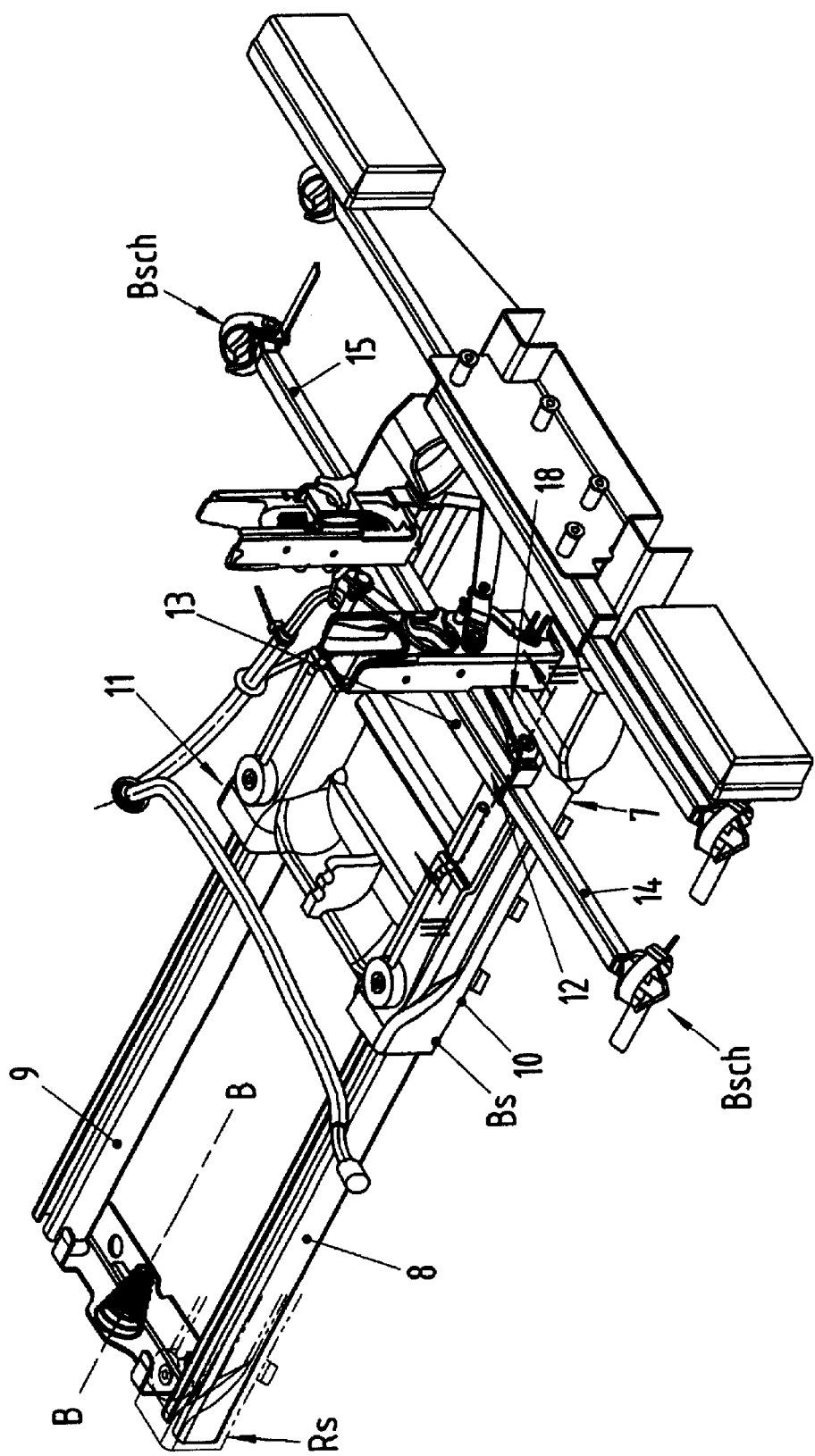
FIG. 2 illustrates a perspective view of the bicycle carrier.

Referring now to FIG. 2, with continual reference to FIG. 1, a perspective view of carrier 4 is shown. Carrier 4 includes a base holder 6 and a support holder 7. A pair of bicycles aligned transversely to longitudinal direction C-C of vehicle 1 may mount onto support holder 7. FIG. 1 illustrates a bicycle 5 mounted onto support holder 7 in this manner. Support holder 7 is movable relative to base holder 6 along longitudinal vehicle direction C-C between a neutral position Rs and an operating position Bs. In neutral position Rs, support holder 7 extends over base holder 6 such that carrier 4 has a compact form. In operating position Bs, support holder 7 extends out from base holder 6 such that carrier 4 has an extended form. Support holder 7 may hold bicycle 5 during operation of vehicle 1 while support holder 7 is in operating position Bs as support holder 7 is extended out from vehicle 1. FIG. 1 illustrates support holder 7 holding bicycle 5 while in its operating position Bs.

In order to enable support holder 7 to be movable relative to base holder 6, base holder 6 includes inner guide rails 8, 9 and support holder 7 includes corresponding outer guide rails 10, 11. Inner guide rails 8, 9 are transversely spaced apart from one another on respective sides of base holder 6 and run along longitudinal vehicle direction C-C. Inner guide rails 8, 9 are on respective sides of central longitudinal plane B-B. Likewise, outer guide rails 10, 11 are transversely spaced apart from one another on respective sides of support holder 7 and run along longitudinal vehicle direction C-C. Outer guide rails 10, 11 are on respective sides of central longitudinal plane B-B. Inner guide rails 8, 9 cooperate with outer guide rails 10, 11 to enable support holder 7 to move relative to base holder 6 along longitudinal vehicle direction C-C between neutral position Rs and operating position Bs.

Carrier 4 further includes a pair of retaining brackets 12 situated on support holder 7. Each retaining bracket 12 is for receiving the wheels of a respective bicycle held on support holder 7. Retaining brackets 12 are structurally and functionally similar. As such, only one retaining bracket 12 is described below.

Retaining bracket 12 includes a tubular guide holder 13 and telescopically supported retaining bracket sections 14, 15 attached thereto. Tubular guide holder 13 has a rectangular cross section. Retaining bracket sections 14, 15 each have a square tube shape. Retaining bracket sections 14, 15 are each designed for respectively attaching to one of front wheel 16 and rear wheel 17 of bicycle 5. As such, retaining brackets 14, 15 are displaceable away from and toward tubular guide holder 13. Fastening straps Bsch are attached to the free ends of retaining bracket sections 14, 15. Fastening straps Bsch respectively hold wheels 16, 17 to retaining bracket sections 14, 15.

A pair of fixing elements 18 respectively hold retaining bracket sections 14, 15 in position in tubular guide holder 13. FIG. 2 illustrates fixing element 18 for retaining bracket section 14. Fixing elements 18 are structurally and functionally the same. As such, only fixing element 18 for retaining bracket section 14 is described below.

Figure 3:
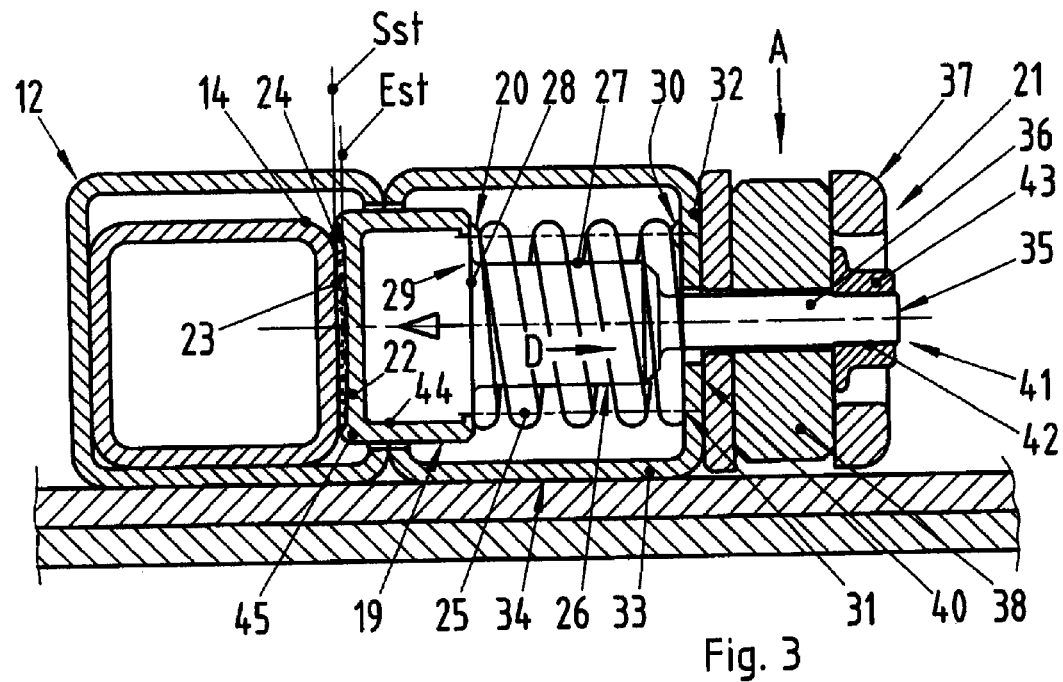
FIG. 3 illustrates an enlarged scale sectional view of the bicycle carrier along line III-III of FIG. 2.
Figure 4:
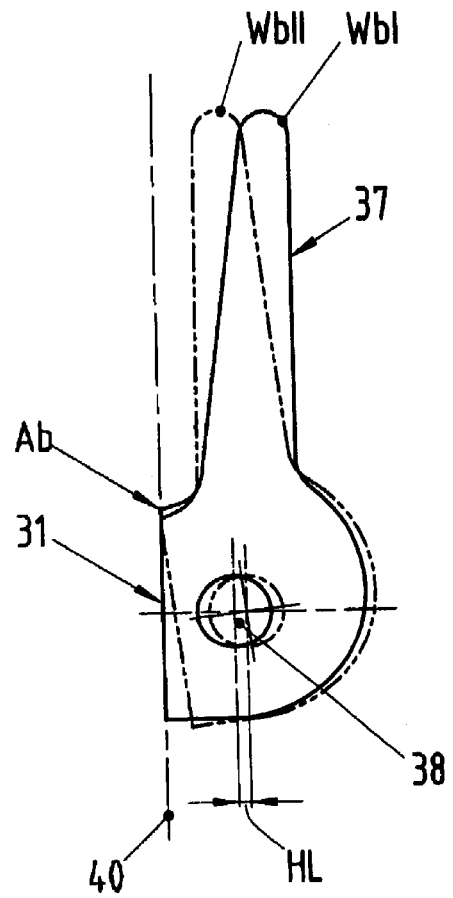
FIG. 4 illustrates a schematic view of the bicycle carrier in the direction of arrow A of FIG. 3.

Referring now to FIGS. 3 and 4, with continual reference to FIGS. 1 and 2, an enlarged scale sectional view of carrier 4 along line III-III of FIG. 2 and a schematic view of carrier 4 in the direction of arrow A of FIG. 3 are respectively shown.

Fixing element 18 includes a locking member 19. A spring 20 (e.g., a compression spring 25) acts upon locking member 19 such that retaining bracket section 14 is fixed in place relative to tubular guide holder 13 (i.e., retaining bracket 12). Locking member 19 is movable between a locked position Sst and an unlocked position Est. Locking member 19 includes a plastic pressure plate 22. Pressure plate 22 cooperates with a supporting wall 23 of retaining bracket section 14 via surface pressure. Pressure plate 22 includes a friction-enhancing lining 24 on its side facing supporting wall 23. Lining 24 is joined in a form-fit and/or material-fit manner to pressure plate 22. Compression spring 25 is biased to move pressure plate 22 into locked position Sst.

An actuating mechanism 21 is operable to move locking member 19 between locked position Sst and unlocked position Est. Actuating mechanism 21 is a quick-release lock. Actuating mechanism 21 includes an actuating pin 26. Actuating pin 26 includes a bolt-like guide section 27. Compression spring 25 encloses guide section 27 of actuating pin 26. Compression spring 25 is supported on a first end side 29 by a first stop 28 of guide section 27 of actuating pin 26. Compression spring 25 is supported on a second end side 30 on an inner side 31 of a stop/second wall 32 of a housing 33 of retaining bracket 12. Housing 33 is part of a tubular body 34 provided directly on retaining bracket 12.

Actuating pin 26 is connected to a bearing bolt 36. Bearing bolt 36 has an extension 35 which passes at one end through stop/second wall 32 of housing 33 of retaining bracket 12. A hand lever 37 is mechanically linked to the other end of extension 35 of bearing bolt 36. Hand lever 37 is operable to move actuating pin 26 in the axial direction D in order to move pressure plate 22 (i.e., locking member 19) against the biasing action of compression spring 25 from locked position Sst into an unlocked position Est.

An inserted axle pin 38 mounts hand lever 37 to bearing bolt 36. Hand lever 37 is able to undergo axial motions WbI to WbII via inserted axle pin 38. Axial motions WbI to WbII cause axial motions of actuating pin 26 within a limited stroke length HL.

Hand lever 37 includes a support track which is in contact with outer side 40 of stop/second wall 32 of housing 33. Hand lever 37 with support of the support track at Ab produces the stroke length HL. In this embodiment, the support track has a straight shape, but may alternatively have a curved shape.

A free end 41 of bearing bolt 36 has a thread 42 for a screw nut 43. Screw nut 43 is supported on axial pin 38 and holds hand lever 37 in position on actuating pin 26 and bearing bolt 36. Actuating pin 26 has a receiving section 44 for pressure plate 22. Receiving section 44 has a U-shaped configuration 45 for at least partially enclosing pressure plate 22.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A bicycle carrier for a vehicle, the carrier comprising:
a support holder for holding a bicycle aligned transversely to a longitudinal direction;
a retaining bracket having a guide holder, a housing, and a retaining bracket section, the guide holder is connected to the support holder, extends transversely to the longitudinal direction, and has first and second walls spaced apart from one another along the longitudinal direction, the retaining bracket section are movable transversely to the longitudinal direction away from and into an end of the guide holder adjacent the first guide holder wall, the second guide holder wall at the first end of the guide holder having an open space therein, the retaining bracket section for holding a wheel of a bicycle held on the support holder;
a fixing element having a spring and a locking member both within the housing at the end of the guide holder and both aligned along the longitudinal direction, the spring extending between the second guide holder wall and the locking member and biasing the locking member away from the second guide holder wall and towards the first guide holder wall into a locked position in which the locking member engages the retaining bracket section and thereby locks the retaining bracket section in place relative to the first end of the guide holder;
an actuating mechanism having an actuating pin aligned along the longitudinal direction and extending through the open space of the second guide holder wall between an outside of the guide holder and the locking member, the actuating pin connected to the locking member and is movable along the longitudinal direction, the actuating pin upon being moved along the longitudinal direction away from the first guide holder wall and towards the second guide holder wall moves the locking member from the locked position into an unlocked position in which the locking member disengages from the retaining bracket section and thereby enables the retaining bracket section to move transversely to the longitudinal direction away from and into the end of the guide holder; and a hand lever operable upon being moved axially about an axle pin oriented transverse to the actuating pin to move the actuating pin along the longitudinal direction away from the first guide holder wall and towards the second guide holder wall to thereby move the locking member into the unlocked position;

wherein the actuating pin includes a screw nut threaded onto an end thereof, wherein the hand lever is fastened to the actuating pin by the screw nut.

2. The carrier of claim 1 wherein:
the hand lever which produces axial lifting motions of the actuating pin rests against the second guide holder wall outside of the guide holder at a support track.

3. The carrier of claim 1 wherein:
the retaining bracket section is telescopically extendible to move transversely to the longitudinal direction away from and into the end of the guide holder.

4. The carrier of claim 1 wherein:
the guide holder is tubular.

5. The carrier of claim 1 wherein:
the locking member includes a pressure plate which cooperates with a supporting wall of the retaining bracket section.

6. The carrier of claim 5 wherein:
the pressure plate includes a friction-enhancing lining on a side facing the supporting wall.

7. The carrier of claim 5 wherein:
the pressure plate is plastic.

8. The carrier of claim 5 wherein:
the spring is biased to move the pressure plate into the locked position.

9. The carrier of claim 8 wherein:
the spring is a compression spring.

10. The carrier of claim 5 wherein:
the actuating pin has a receiving section for the pressure plate.

11. The carrier of claim 10 wherein:
the pressure plate partially encloses the receiving section.

12. A bicycle carrier for a vehicle, the carrier comprising:
a base holder mountable to a vehicle;
a support holder for holding a bicycle aligned transversely to a longitudinal direction of a vehicle, wherein the support holder is movably connected to the base holder to be movable along the longitudinal vehicle direction between a neutral position in which the holders extend over one another and an operating position in which the support holder extends out from the base holder;

a retaining bracket having a guide holder, a housing, and a retaining bracket section, the guide holder is connected to the support holder, extends transversely to the longitudinal vehicle direction, and has first and second walls spaced apart from one another along the longitudinal vehicle direction, the retaining bracket section is telescopically connected to an end of the guide holder to move transversely to the longitudinal vehicle direction away from and into the end of the guide holder adjacent the first guide holder wall, the second guide holder wall at the end of the guide holder having an open space therein, the retaining bracket section for holding a wheel of a bicycle held on the support holder;

a fixing element having a spring and a locking member both within the housing at the end of the guide holder and both aligned along the longitudinal direction, the spring extending between the second guide holder wall and the locking member and biasing the locking member away from the second guide holder wall and towards the first guide holder wall into a locked position in which the locking member engages the retaining bracket section and thereby locks the retaining bracket section in place relative to the end of the guide holder;

an actuating mechanism having an actuating pin aligned along the longitudinal direction and extending through the open space of the second guide holder wall between an outside of the guide holder and the locking member, the actuating pin connected to the locking member and is movable along the longitudinal direction, the actuating pin upon being moved along the longitudinal direction away from the first guide holder wall and towards the second guide holder wall moves the locking member from the locked position into an unlocked position in which the locking member disengages from the retaining bracket section and thereby enables the retaining bracket section to move transversely to the longitudinal direction away from and into the end of the guide holder; and a hand lever operable upon being moved axially about an axle pin oriented transverse to the actuating pin to move the actuating pin along the longitudinal direction away from the first guide holder wall and towards the second guide holder wall to thereby move the locking member into the unlocked position;

wherein the actuating pin includes a thread for a screw nut by which the hand lever is fastened to the actuating pin.

13. The carrier of claim 12 wherein:
a part of the actuating pin is enclosed by the spring.

* * * * *